United States Patent
Eng et al.

(10) Patent No.: US 10,241,732 B2
(45) Date of Patent: Mar. 26, 2019

(54) PROCESSING PRINT JOBS WITH A SINGLE SHEET JOB MODEL

(71) Applicants: Katie Ashley Eng, Boulder, CO (US); David Ward, Broomfield, CO (US)

(72) Inventors: Katie Ashley Eng, Boulder, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 24 days.

(21) Appl. No.: 15/251,276

(22) Filed: Aug. 30, 2016

(65) Prior Publication Data
US 2018/0059994 A1    Mar. 1, 2018

(51) Int. Cl.
*G06F 3/12* (2006.01)
*G06K 15/02* (2006.01)

(52) U.S. Cl.
CPC ............ *G06F 3/122* (2013.01); *G06F 3/1247* (2013.01); *G06F 3/1282* (2013.01); *G06K 15/1827* (2013.01); *G06K 15/1836* (2013.01); *G06K 15/1851* (2013.01); *G06K 15/1861* (2013.01); *G06K 15/1868* (2013.01); *G06F 3/1206* (2013.01)

(58) Field of Classification Search
None
See application file for complete search history.

(56) References Cited

U.S. PATENT DOCUMENTS

| | | | |
|---|---|---|---|
| 6,671,062 B1 | 12/2003 | Kanipakam et al. | |
| 8,223,385 B2 | 7/2012 | Minhas | |
| 8,368,919 B2 | 2/2013 | Morales et al. | |
| 2004/0163049 A1* | 8/2004 | Mori | G06F 17/248 715/274 |
| 2007/0165248 A1 | 7/2007 | Utsunomiya et al. | |
| 2008/0144088 A1* | 6/2008 | Furuya | G06F 3/1204 358/1.15 |
| 2009/0225350 A1* | 9/2009 | Carney | G06K 15/02 358/1.15 |
| 2010/0202008 A1 | 8/2010 | Aronshtam et al. | |
| 2011/0188060 A1 | 8/2011 | Voss | |
| 2012/0194861 A1* | 8/2012 | Miyaguchi | G06F 3/1205 358/1.15 |
| 2014/0180651 A1 | 6/2014 | Lysak et al. | |

(Continued)

FOREIGN PATENT DOCUMENTS

| | | |
|---|---|---|
| IN | 258130 A1 | 12/2006 |
| WO | 2009145878 A1 | 12/2009 |

OTHER PUBLICATIONS

Nunes, T. et al; Job Profiling in High Performance Printing; DocEng '09, Sep. 16-18, 2009 Munich, Germany; Copyright 2009.

*Primary Examiner* — King Y Poon
(74) *Attorney, Agent, or Firm* — Duft & Bornsen, PC (57) ABSTRACT

System and methods for processing and printing print jobs with a single sheet job model job model. In one embodiment, a print controller includes an interface that receives a print job, and a processing unit that initiates a processing task for a group of pages in the print job. The print controller also includes a sheet controller that establishes a single sheet job model in memory for the processing task, and that iteratively inserts sheet properties of a set of pages of the group into the single sheet job model, provides the single sheet job model with the sheet properties to the processing task, and erases the sheet properties from the single sheet job model.

20 Claims, 5 Drawing Sheets

(56) References Cited

U.S. PATENT DOCUMENTS

2014/0279393 A1* 9/2014 Coomes ............... G06Q 40/025
              705/38
2016/0077768 A1  3/2016 Bandyopadhyay et al.
2016/0110144 A1* 4/2016 Bandyopadhyay ... G06F 3/1252
              358/1.18

* cited by examiner

PROCESSING PRINT JOBS WITH A SINGLE SHEET JOB MODEL

FIELD OF THE INVENTION

The invention relates to the field of printing systems, and in particular, to efficient print job processing.

BACKGROUND

Print systems capable of handling large print jobs (e.g., hundreds or thousands of documents) typically include a print controller that receives a print job and rasterizes the logical pages of the print job into bitmap images. In N-up printing, the print controller assembles multiple logical pages onto a sheet side for printing. In addition to rasterization and assembly, the print controller may perform other processes in the course of processing a print job, such as preflight, preview, and job ticket editing.

Each process of the print controller performs its function by referring to a job model that captures the properties of all sheets in the print job. If one of the print controller's processes changes the properties of a sheet, then the layout of the entire print job may be affected. Therefore, a process may store a new job model in memory so that the print controller's other processes are able to reference the updated information in the print job. Each produced job model is typically stored in solid state memory, such as Random Access Memory (RAM), for fast access. However, solid state memory is an expensive, finite resource and can quickly become full storing a job model and its updated versions, especially for large print jobs.

SUMMARY

Embodiments described herein provide for processing print jobs with a single sheet job model. A processing task's request for sheet properties may be fulfilled using a single sheet job model in memory that is continually renewed with individual sheet properties of a print job. This reduces the memory footprint for processing a print job and its properties.

One embodiment is a print controller of a print system. The print controller includes an interface that receives a print job, and a processing unit that initiates a processing task for a group of pages in the print job. The print controller also includes a sheet controller that establishes a single sheet job model in memory for the processing task, and that iteratively inserts sheet properties of a set of pages in the group into the single sheet job model, provides the single sheet job model with the sheet properties to the processing task, and erases the sheet properties from the single sheet job model.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
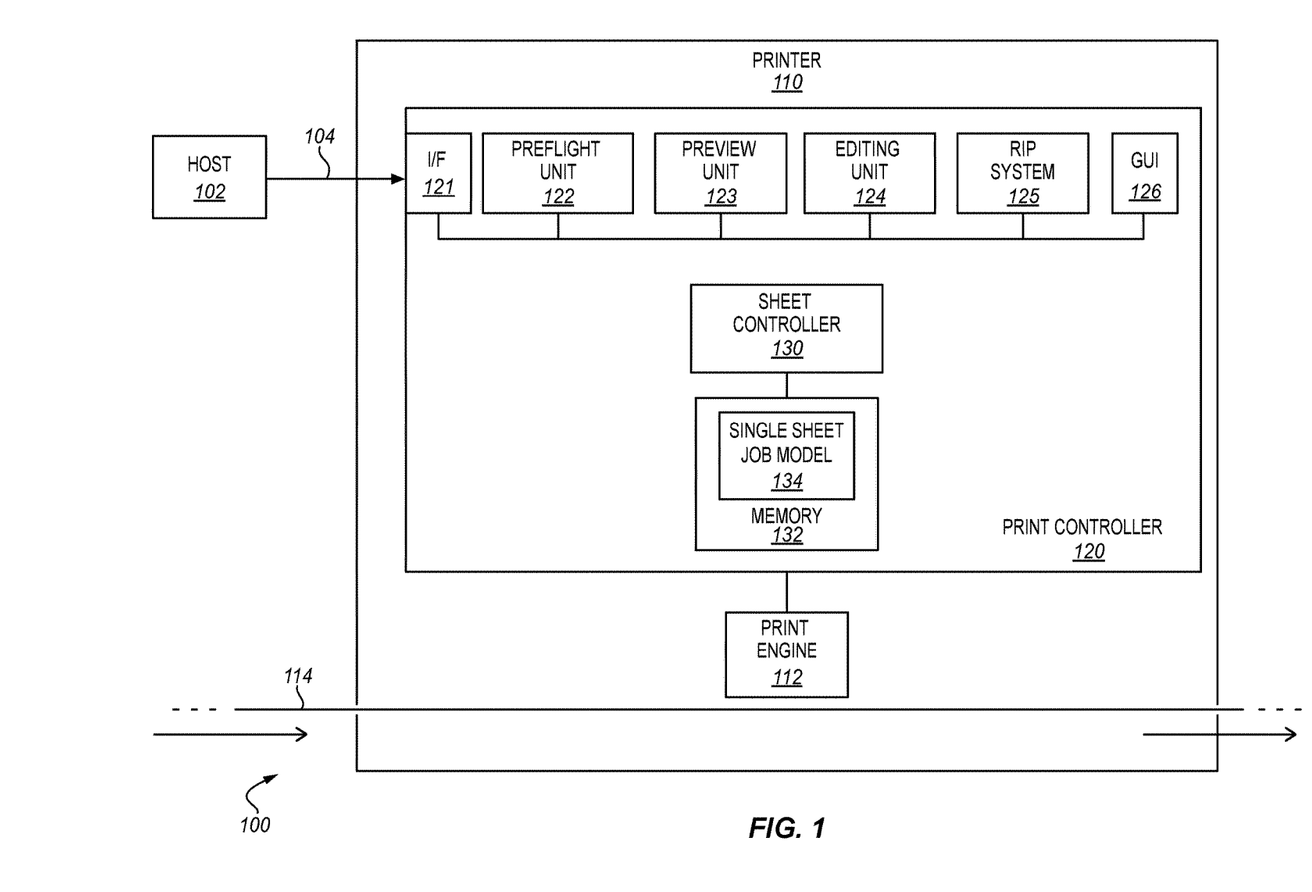
FIG. 1 is a block diagram of a print system in an exemplary embodiment.

FIG. 1 is a block diagram of a print system 100 in an exemplary embodiment. Print system 100 includes a host 102 operable to submit print jobs 104 and a printer 110 operable to receive incoming print jobs 104. Printer 110 includes a print controller 120 and a print engine 112. Print controller 120 receives incoming print jobs 104 via an interface 121 and transmits rasterized data for a print job to print engine 112. Print engine 112 may comprise any combination of printing machinery operable to mark a printable media 114 with the rasterized data. Print jobs 104 may include raw print data in a page description format such as Printer Control Language (PCL), PostScript data, etc. Print jobs 104 may also include a job ticket that defines various characteristics of the print job, such as media information, page inserts, and page exceptions for a specified page range in the print job.

Print controller 120 may perform a number of data processing operations on print jobs 104 prior to print engine 112 marking printable media 114. Print controller 120 includes processing units 122-125 operable to perform processing tasks. Preflight unit 122 is operable to collect job information (e.g., media to use in the job, etc.), preview unit 123 is operable to provide a preview of print data to a user via graphical user interface (GUI) 126, editing unit 124 is operable to allow a user to edit a job ticket via GUI 126, and Raster Image Processor (RIP) system 125 is operable to interpret, assemble, render, rasterize, or otherwise convert raw sheet sides for print jobs 104 into sheet side bitmaps. Processing units 122-125 may perform processing tasks concurrently or consecutively in print controller 120. Alternatively or additionally, processing units 122-125 may communicate with print controller 120 from an external location. Processing units 122-125 are exemplary for purposes of discussion and additional or alternative processing units and/or processing tasks may communicate with or be implemented in print controller 120.

In previous systems, processing units 122-125 of print controller 120 perform their respective processing tasks by sharing a multi-sheet job model in memory that includes properties of every sheet in the print job. If a processing task updates a sheet property in the job model, a new or additional job model is stored in memory to represent the entire print job with updated sheet properties. This allows other processing units 122-125 to perform subsequent processing tasks using the updated job model. However, the shared job model configuration requires large footprints of expensive memory.

Print controller 120 is therefore enhanced with a sheet controller 130 which is any system, component, or device operable to manage processing tasks of processing units 122-125 based on a single sheet job model. Sheet controller 130 may continually renew/erase individual sheet properties using single sheet job model 134 in memory 132 for a processing task of processing unit 122-125. A processing unit 122-125 may therefore obtain the appropriate sheet properties for its processing task using a single sheet job model 134 that occupies a fraction of space in memory 132 as compared to a multi-sheet job model.

Figure 2:
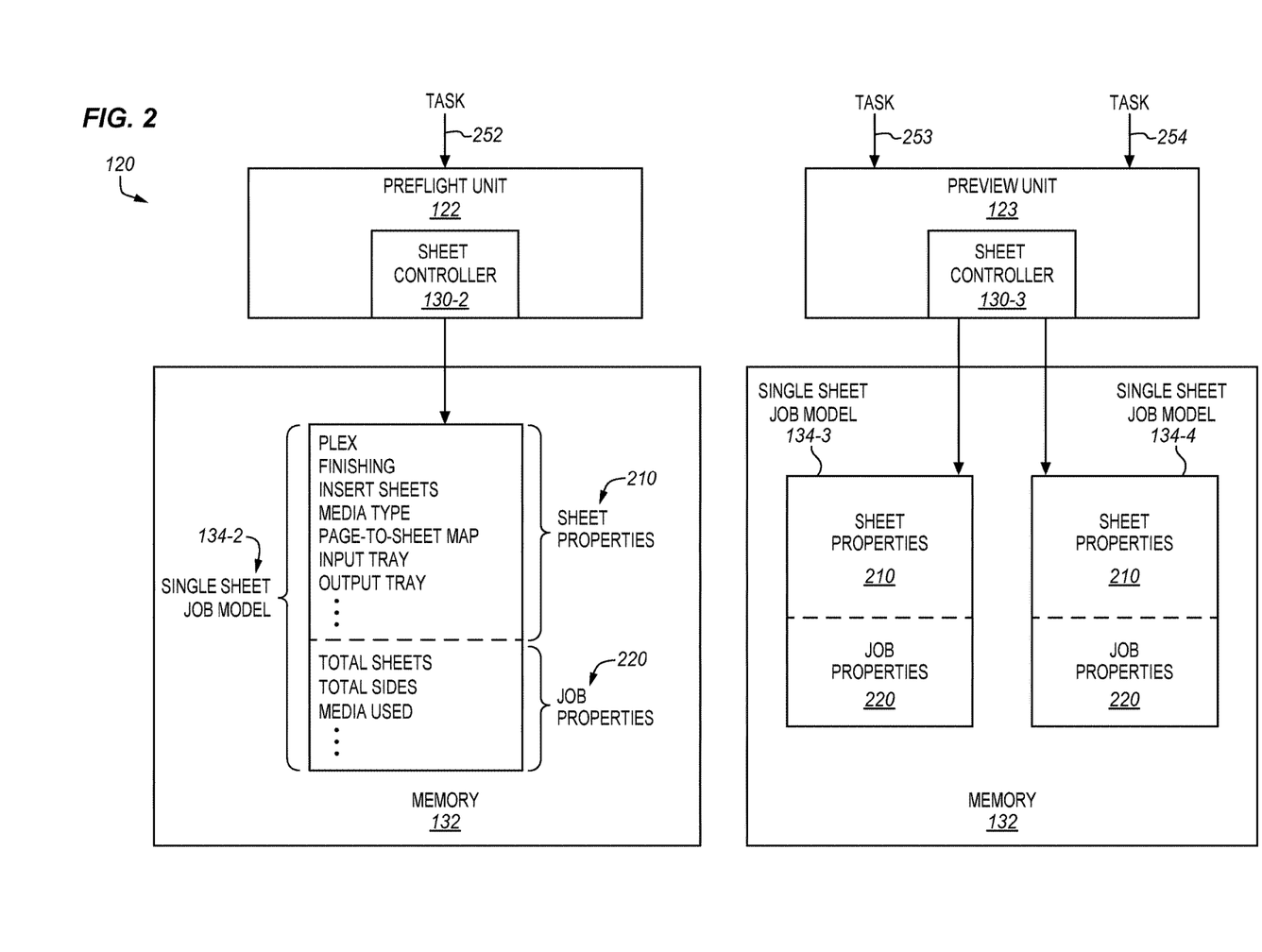
FIG. 2 illustrates a print controller operable to manage processing tasks based on a single sheet model in an exemplary embodiment.

FIG. 2 illustrates print controller 120 operable to manage processing tasks based on a single sheet model in an exemplary embodiment. As illustrated in this example, each processing unit 122-125 may include or be designated its own sheet controller 130, and each task of a processing unit 122-125 may be completed using a single sheet job model 134 in memory 132. Preflight unit 122 includes sheet controller 130-2 and is operable to perform processing task 252 using single sheet job model 134-2 in memory 132. Similarly, preview unit 123 includes sheet controller 130-3 and is operable to perform processing task 253 and processing task 254 using single sheet job model 134-3 and single sheet job model 134-4, respectively, in memory 132. Thus, sheet controller 130 may manage multiple processing tasks of a processing unit 122-125 using a single sheet job model 134 for each task. Each processing unit 122-125 may include its own memory 132 or be designated a portion of memory 132 of print controller 120.

Single sheet job model 134 includes a sheet property portion 210 and a job property portion 220. Sheet property portion 210 includes sheet properties of a single sheet of the print job, such as plex (e.g., simplex or duplex), finishing (e.g., gloss type, stapling, etc.), insert pages to attach before or after a sheet, media information (e.g., size, type, color, weight, etc. for a sheet), which logical pages belong to a sheet (e.g., n-up printing configuration of the sheet), input/output tray for printing the sheet, etc. A sheet may include one or more logical pages and single sheet job model 134 may include properties for all sides of the sheet (e.g., two sides for a duplex sheet). Job property portion 220 includes job properties of the print job that are a collection of sheet properties across the requested group of pages (e.g., encompassing some or every page of the print job). Examples of job properties include the total number of sheets/sides to print for the print job, which media is to be used for the print job, etc.

As sheet controller 130 manages a processing task of a processing unit 122-125, sheet property portion 210 of single sheet job model 134 may include only sheet properties of individual sheets currently being processed while job property portion 220 may maintain job properties for all processed pages for a processing task. This enables each processing unit 122-125 to efficiently perform a processing task for print controller 120 with minimal expansion or usage of memory 132 for print job processing. Further details of operation of sheet controller 130 are discussed below.

Figure 3:
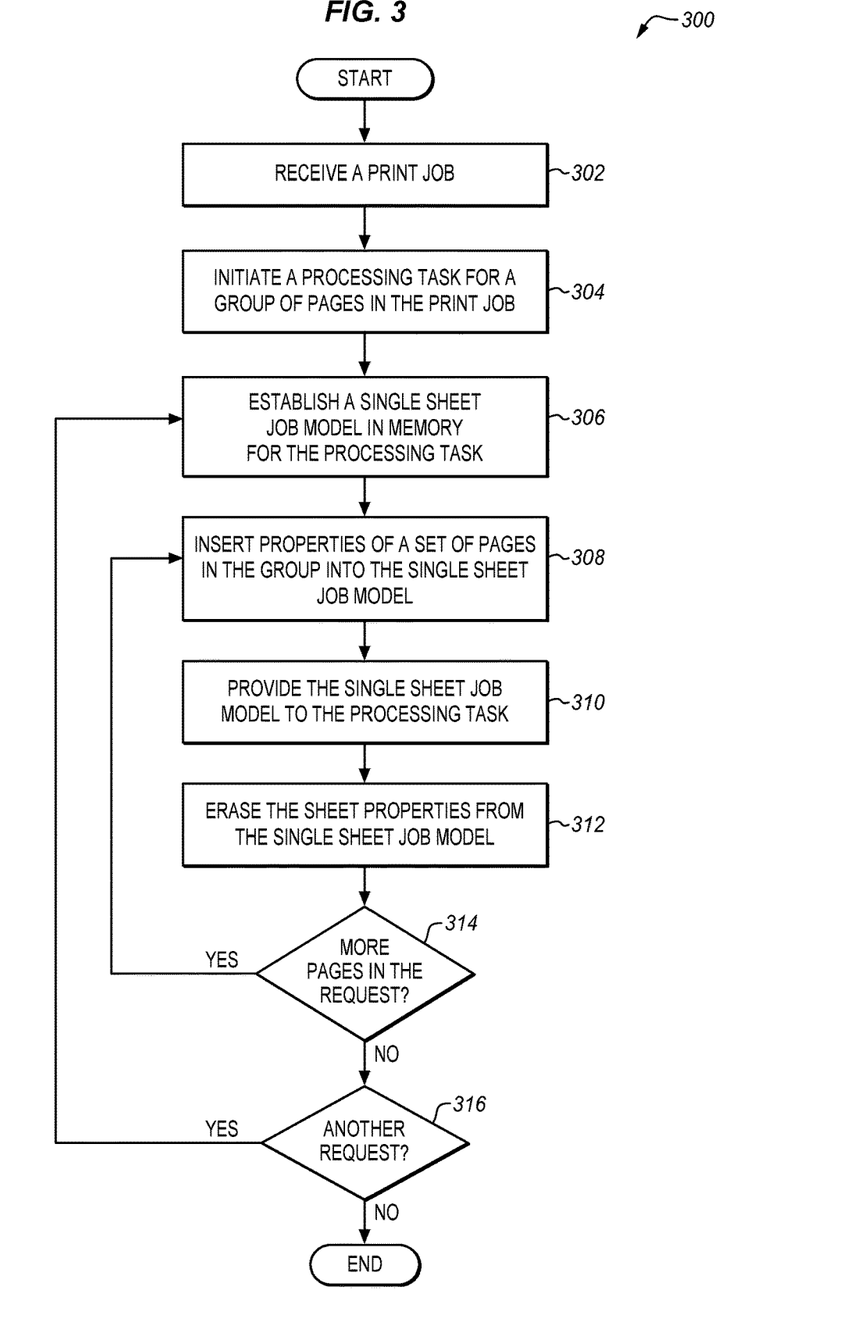
FIG. 3 is a flow chart illustrating a method for single sheet job processing in an exemplary embodiment.

FIG. 3 is a flow chart illustrating a method 300 for single sheet job processing in an exemplary embodiment. The steps of the method 300 will be described with respect to print system 100 of FIG. 1, though it will be appreciated that the steps may be performed in other systems, may include other steps not shown, and may be performed in an alternate order.

At step 302, print controller 120 receives a print job 104. The print job 104 may be accompanied with an associated job ticket that defines metadata for the print job 104. One or more processing units 122-125 may perform a preprocess task that analyzes the print job 104 and/or job ticket to determine/collect media information for print job 104. For example, preflight unit 122 may provide a collection of job properties for the print job 104 after completion of its preflight task. Sheet controller 130 may receive/retrieve the job properties from the preprocess task for insertion to the job property portion 220 of single sheet job model 134.

At step 304, a processing unit 122-125 of print controller 120 initiates a processing task for a group of pages in the print job 104. The group of pages may be a specified range of pages in the print job 104 or all pages of the print job 104. That is, each processing unit 122-125 may request page ranges (e.g., portion of a print job 104) or all pages of a print job 104 to compute sheets of the job for the processing task. For example, preview unit 123 may request a range of pages in the print job 104 for previewing according to a user request via GUI 126, editing unit 124 may request a range of pages for editing by a user via GUI 126, RIP system 125 may request all pages in the print job 104 for rasterizing, etc. Sheet controller 130 may detect or receive a request of a processing unit 122-125 and perform a series of actions in response. In one embodiment, sheet controller 130 may initialize all existing single sheet job models 134 in memory 132 by erasing (e.g., clearing, resetting, etc.) sheet property portions 210 and/or job property portions 220 of respective single sheet job models 134.

At step 306, sheet controller 130 establishes a single sheet job model 134 in memory 132 for the processing task. In doing so, sheet controller 130 may create a new single sheet job model 134 in memory 132 for the processing task or designate an existing single sheet job model 134 in memory 132 for the processing task. Sheet controller 130 may therefore create or assign single sheet job model 134 for processing multiple remaining processing tasks for the print job 104 or a single processing task for the print job 104.

At step 308, sheet controller 130 inserts properties of a set of pages in the group into the single sheet job model 134. In doing so, sheet controller 130 may arrange multiple pages within the group into a set based on an N-up configuration of the pages, where N is an integer that is one or greater than one. For example, in a 2-up print job 104, properties from two pages in the requested group may be inserted at a time into single sheet job model 134. Sheet controller 130 may retrieve multiple page properties (e.g., from print data/job ticket) of pages in the group and skip retrieval of any pages of the print job 104 that do not belong to the group of pages of the request. Sheet controller 130 may insert retrieved page properties into sheet property portion 210 of single sheet job model 134 and additionally may insert job properties of a set of pages in the group into single sheet job model 134 in job property portion 220. Sheet property portion 210 of single sheet job model 134 may be designated or assigned to a unit of memory 132 that represents individual sheet properties of the print job 104.

At step 310, sheet controller 130 provides the single sheet job model 134 to the processing task. That is, sheet controller 130 may send or allow access to single sheet job model 134 in memory 132 to the processing unit 122-125 that requested pages of the print job 104 for its processing task. Processing unit 122-125 may carry out its designed processing task as sheet property information is received and/or perform further processing for the print job 104 as sheet property information is received.

At step 312, sheet controller 130 erases the sheet properties from single sheet job model 134. After sheet property information is made available for the processing task, sheet controller 130 may clear units of memory 132 corresponding to sheet property portion 210 of single sheet job model 134. Sheet property portion 210 of single sheet job model 134 is therefore made available for an additional set of page properties. Job sheet property portion 210 of single sheet job model 134 may be maintained at this step so that the job properties may be updated later with additional pages of the requested group of pages.

In step 314, sheet controller 130 determines whether there are additional pages in the request not yet provided to processing unit 122-125. If so, method 300 returns to step 308 and sheet controller 130 inserts properties of the next set of pages in the group into the single sheet job model 134 and repeats steps 310-312. In this manner, sheet controller 130 iteratively inserts a set of page properties into the sheet property portion 210, provides single sheet job model 134 to processing unit 122-125, and erases the set of pages properties from the sheet property portion 210. Otherwise, if there are not additional pages in the request, method 300 proceeds to step 316. If there are not additional pages in the request, then job property portion 220 of the single sheet job model 314 may represent the final job properties per the request.

In step 316, sheet controller 130 determines whether there is another request for pages in the print job 104. That is, sheet controller 130 may determine whether another processing unit 122-125 is to carry out an additional processing task to prepare print job 104 for printing. If so, method 300 returns to step 306 and sheet controller 130 establishes another single sheet job model 134 in memory 132 for the next processing task. In other words, sheet controller 130 may create a new single sheet job model 134 in memory 132 for the processing task or designate an existing single sheet job model 134 in memory 132 for the processing task. For example, sheet controller 130 may retain units of memory 132 that correspond with job property portion 220 of single sheet job model 134 to maintain job property portion 220 of single sheet job model 134 during performance of a processing task or multiple processing tasks for the print job 104. Otherwise, if there are no additional processing tasks for the print job 104, method 300 may end.

In method 300, sheet controller 130 may use single sheet job model 134 in memory 132 to represent any or all pages of a print job 104. Processing units 122-125 may receive individual sheet properties quickly from memory 132 according to an appropriate configuration of the sheets and without storing/maintaining a collection of all individual sheet properties for the print job 104 at the same time. Additionally, each processing unit 122-125 may re-use job properties stored in single sheet job model 134 which may be substantially consistent throughout a print job 104 and therefore significant data reduction in memory 132 may be realized for processing large print jobs 104.

In one embodiment, sheet controller 130 may determine whether to implement a single sheet job model or a multi-sheet job model based on a type of print job 104. For example, in response to detecting a print job 104 that is a multiple copy print job 104 (e.g., mopy job), sheet controller 130 may implement, or direct print controller 120 to implement, a traditional multi-sheet job model for the print job 104 that may be shared in memory 132 among processing units 122-125.

In another embodiment, in response to detecting a print job 104 that is a redrive print job 104 (e.g., a suspend/resume print job 104 or a print job 104 produced for a detected paper jam in print system 100) sheet controller 130 may implement a single sheet job model which uses modified sheet identifiers that include job model information. That is, sheet controller 130 may assign each sheet a sheet number (e.g., a page number, such as the smallest page number, of one of the pages belonging to the sheet) and further assign each sheet an offset for the sheet that identifies an order of the sheet with respect to other sheets that share the sheet number. For example, the offset may be set to zero (or some other identifier) if the sheet is a data sheet that includes a logical page. Or, the offset may be set to a negative or positive integer based on whether, for example, an insert sheet is indicated to be attached before or after a logical page that belongs in another sheet. Thus, if or when the redrive print job 104 is suspended, the job model information of the suspended sheet includes information for how that sheet is related to logical pages within the print job 104. Sheet controller 130 may therefore initiate processing for the remaining portion of the print job 104 from the suspended sheet rather than from the beginning of the print job 104 to reduce computation time while still employing the single sheet job model.

EXAMPLES

Figure 4:
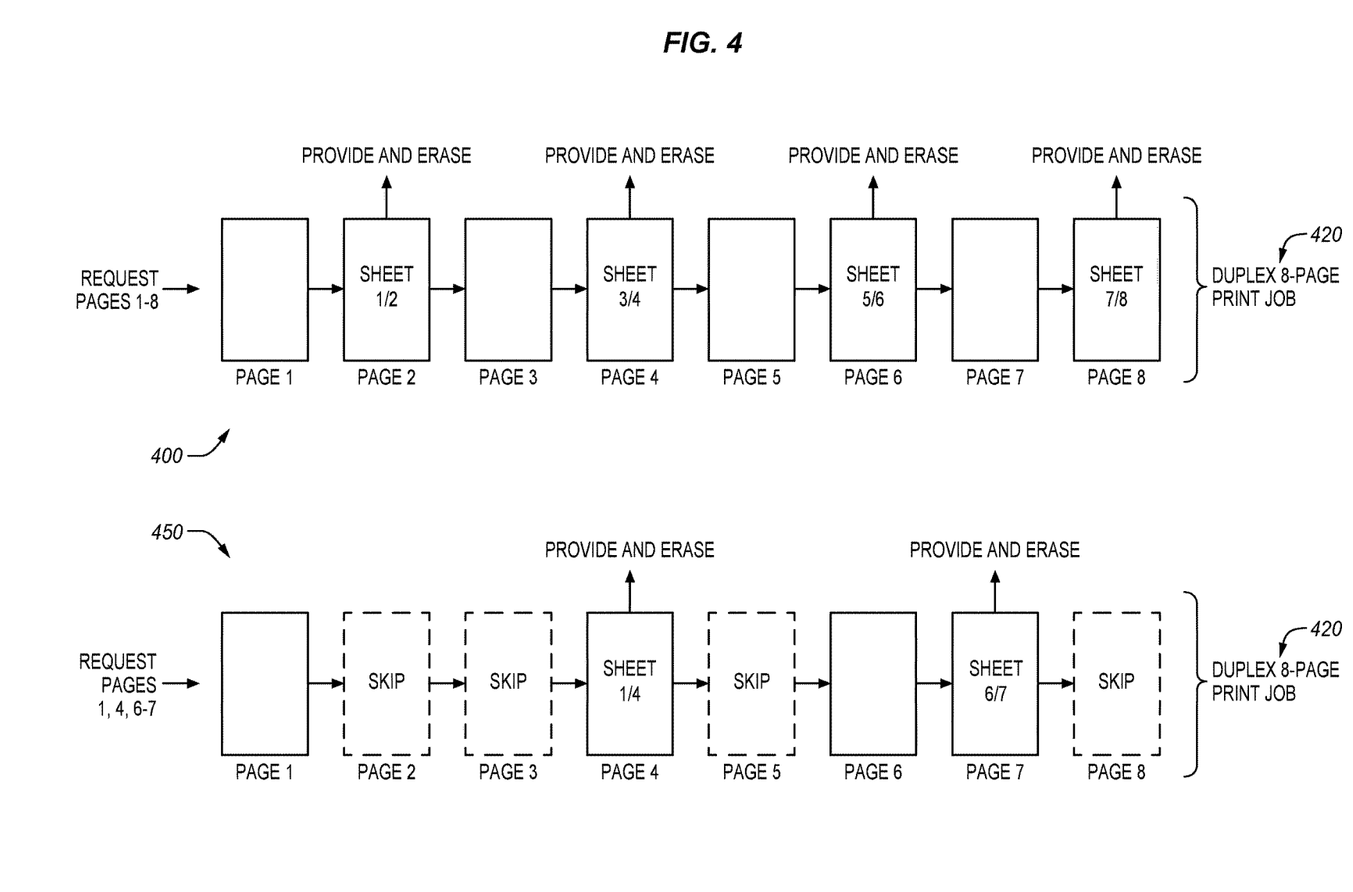
FIG. 4 illustrates computation sequences for processing tasks requests in an exemplary embodiment.

FIG. 4 illustrates computation sequences for processing tasks requests 400/450 in an exemplary embodiment. Assume, for this example, that print controller 120 receives a print job 420 with eight logical pages to be printed in duplex format. Further assume that preflight unit 122 has processed all eight logical pages of the print job 420 for job properties and sheet controller 130 has stored the job properties in job property portion 220 of single sheet job model 134 in memory 132. In that case, the job properties of job property portion 220 represents the entire print job.

Sheet controller 130 subsequently detects a request by preview unit 123 to preview all pages in print job 420, pages 1-8. In response, sheet controller 130 performs computation sequence 400. That is, sheet controller 130 determines that a first sheet in the print job 420 includes pages 1 and 2 according to the duplex configuration. Sheet controller 130 therefore retrieves the properties of pages 1 and 2 (e.g., from print data, job ticket, etc.), inserts the sheet properties as a set into a sheet property portion 210 of single sheet job model 134, provides single sheet job model 134 to preview unit 123, and erases sheet property portion 210. Sheet controller 130 repeats this process for the set of pages 3 and 4, the set of pages 5 and 6, and the set of pages 7 and 8. As this occurs, job property portion 220 of single sheet job model 134 in memory 132 remains constant.

Sheet controller 130 also detects a request by editing unit 124 to edit pages 1, 4, and 6-7 of print job 420. In response, sheet controller 130 performs computation sequence 450.

That is, sheet controller 130 retrieves the properties of page 1 and the skips/ignores pages 2 and 3 which do not belong in the group of pages in the request. Sheet controller 130 then retrieves the properties of page 4, and inserts the combined properties of pages 1 and 4 into sheet property portion 210 of single sheet job model 134 as a set according to the duplex configuration. After providing single sheet job model 134 to editing unit 124, sheet controller 130 erases sheet property portion 210, skips page 5, and inserts 6 and 7 as a set into sheet property portion 210. Sheet controller 130 provides single sheet job model 134 to the processing task, erases sheet property portion 210, and then skips page 8 since it also is not part of the request of editing unit 124.

Figure 5:
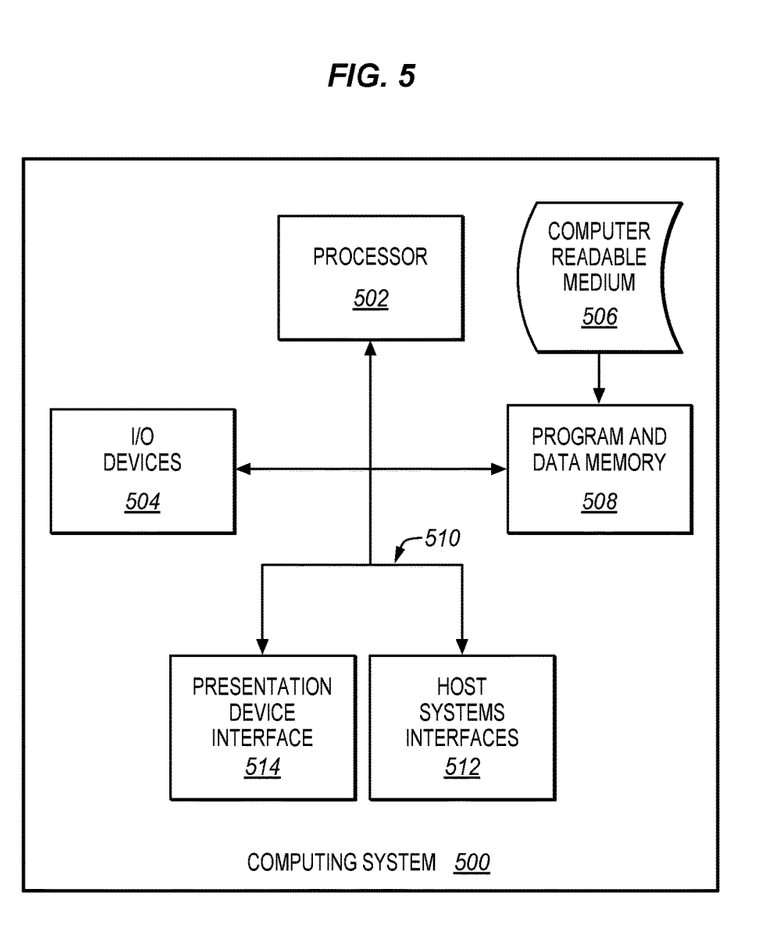
FIG. 5 illustrates a processing system operable to execute a computer readable medium embodying programmed instructions to perform desired functions in an exemplary embodiment.

Print controller 120 and related components such as sheet controller 130 and processing units 122-125 may perform the operations and functions described herein by executing one or more sequences of instructions stored on a machine/computer readable medium. Embodiments disclosed herein can take the form of software, hardware, firmware, or various combinations thereof. FIG. 5 illustrates a computing system 500 configured to execute a computer readable medium embodying programmed instructions to perform desired functions (e.g., of sheet controller 130, processing units 122-125, etc.) in an exemplary embodiment. Computing system 500 is configured to perform the above operations by executing programmed instructions tangibly embodied on computer readable medium 506. In this regard, embodiments can take the form of a computer program accessible via computer-readable medium 506 providing program code for use by a computer or any other instruction execution system. For the purposes of this description, computer readable storage medium 506 can be anything that can contain or store the program for use by the computer.

Computer readable medium 506 can be an electronic, magnetic, optical, electromagnetic, infrared, or semiconductor device. Examples of computer readable storage medium 506 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Computing system 500, being suitable for storing and/or executing the program code, includes at least one processor 502 coupled to program and data memory 508 through a system bus 510. Processor 502 may include any electronic circuits and/or optical circuits that are able to perform functions. For example, processor 502 may be communicatively coupled with components of print system 100 and perform any functionality described herein for print controller 120 and/or sheet controller 130. Processor 502 may include one or more Central Processing Units (CPU), microprocessors, Digital Signal Processors (DSPs), Application-specific Integrated Circuits (ASICs), Programmable Logic Devices (PLD), control circuitry, etc.

Program and data memory 508 can include local memory employed during actual execution of the program code, bulk storage, and cache memories that provide temporary storage of at least some program code and/or data in order to reduce the number of times the code and/or data are retrieved from bulk storage during execution. Memory 132 of print system 100 may include any electronic circuits, optical circuits, and/or magnetic circuits that are able to store data, such as one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include batterybacked DRAM and battery-backed SRAM.

Input/output or I/O devices 504 (including but not limited to keyboards, displays, pointing devices, etc.) can be coupled either directly or through intervening I/O controllers. Host system interfaces 512 may also be integrated with the system to enable computing system 500 to become coupled to other data processing systems or storage devices through intervening private or public networks. Modems, cable modems, SCSI, Fibre Channel, and Ethernet cards are just a few of the currently available types of network or host interface adapters. Presentation device interface 514 may be integrated with the system to interface to one or more presentation devices, such as printing systems and displays for presentation of presentation data generated by processor 502. Although specific embodiments were described herein, the scope of the inventive concept(s) is not limited to those specific embodiments. The scope of the inventive concept(s) is defined by the following claims and any equivalents thereof.

We claim:

1. A print controller of a print system, the print controller comprising:
   an interface configured to receive a print job including a plurality of pages;
   a processing unit configured to request sheet properties for a group of pages among the plurality of pages in the print job for performing a processing task on the group of pages, wherein the sheet properties are print properties for individual sheets; and
   a sheet controller configured to receive the request from the processing unit, and to establish a single sheet job model in memory for the request, wherein the single sheet job model defines a unit of the memory designated to repeatedly refresh sheet property content of a predetermined number of pages;
   the sheet controller further configured to provide the sheet properties of the group of pages to the processing unit to fulfill the request by iteratively:
      retrieving sheet properties of a number of pages of the group based on the predetermined number of pages of the single sheet job model;
      inserting the sheet properties of the number of pages of the group into the single sheet job model;
      providing contents of the single sheet job model to the processing unit to supply the sheet properties of the number of pages to the processing task; and
      erasing the sheet properties of the number of pages from the single sheet job model.

2. The print controller of claim 1 wherein:
   the single sheet job model includes a job property portion that includes job properties of the group and a sheet property portion that includes the sheet properties; and
   the sheet controller is configured to fulfill the request of the processing unit by iteratively: inserting the sheet properties of the number of pages into the sheet property portion of the single sheet job model, providing the sheet properties of the number of pages stored in the single sheet job model to the processing task, erasing the sheet properties of the number of pages from the sheet property portion of the single sheet job model, and maintaining the job properties of the print job in the job property portion of the single sheet job model during processing of the group of pages for the processing task.

3. The print controller of claim 2 wherein:
the processing unit is a preflight unit configured to process the print job for the job properties; and
the sheet controller is configured to insert the job properties obtained from the preflight unit into the job property portion of the single sheet job model, and to maintain the job property portion as a constant in the single sheet job model during processing of another group of pages for another task performed by one of a preview unit, an editing unit, or a Raster Image Processing (RIP) system.

4. The print controller of claim 2 wherein:
the sheet controller is configured to insert the sheet properties of the number of pages according to an N-up configuration of the group of pages, wherein N is greater than one; and
the single sheet job model in the memory represents sheet properties of all of the pages in the request for processing the group of pages for the processing task.

5. The print controller of claim 1 wherein:
the print controller is configured to determine that the print job is a redrive print job, and to create a multi-sheet job model for processing the print jobs instead of the single sheet job model, wherein the multi-sheet job model includes page offsets for reprocessing of the print job.

6. The print controller of claim 1 wherein:
the print controller is configured to determine that the print job is a multiple copy type print job, and to create a multi-sheet job model for processing the multiple copy type print job instead of the single sheet job model.

7. The print controller of claim 1 further comprising:
multiple processing units configured to initiate processing tasks for the print job;
wherein each of the multiple processing units includes its own sheet controller configured to perform processing tasks using the single sheet job models.

8. A method comprising:
receiving a print job that includes a plurality of pages;
receiving a request for sheet properties of a group of pages among the plurality of pages in the print job for a processing task by a processing unit, wherein the sheet properties are print properties for individual sheets;
establishing a single sheet job model in memory for the request, wherein the single sheet job model defines a unit of the memory designated to repeatedly refresh sheet property content of a predetermined number of pages; and
providing sheet properties of the group of pages to the processing unit to fulfill the request by iteratively:
retrieving sheet properties of a number of pages of the group based on the predetermined number of pages of the single sheet job model;
inserting the sheet properties of the number of pages of the group into the single sheet job model;
providing contents of the single sheet job model to the processing unit to supply the sheet properties of the number of pages to the processing task; and
erasing the sheet properties of the number of pages from the single sheet job model.

9. The method of claim 8 wherein:
the single sheet job model includes a job property portion that includes job properties of the group and a sheet property portion that includes the sheet properties; and
the method further comprises fulfilling the request of the processing unit by iteratively:
inserting the sheet properties of the number of pages into a sheet property portion of the single sheet job model;
providing the sheet properties of the number of pages stored in the single sheet job model to the processing task;
erasing the sheet properties of the number of pages from the sheet property portion of the single sheet job model; and
maintaining the job properties of the print job in the job property portion of the single sheet job model during processing of the group of pages for the processing task.

10. The method of claim 9 further comprising:
processing the print job for the job properties with a preflight unit;
inserting the job properties obtained from the preflight unit into the job property portion of the single sheet job model; and
maintaining the job property portion as a constant in the single sheet job model during processing of another group of pages for another task by one of a preview unit, an editing unit, or a Raster Image Processing (RIP) system.

11. The method of claim 9 further comprising:
inserting the sheet properties of the number of pages according to an N-up configuration of the group of pages, wherein N is greater than one, wherein the single sheet job model in the memory represents sheet properties of all of the pages in the request for processing the group of pages for the processing task.

12. The method of claim 8 further comprising:
determining that the print job is a redrive print job; and
creating a multi-sheet job model for processing the print jobs instead of the single sheet job model, wherein the multi-sheet job model includes page offsets for reprocessing of the print job.

13. The method of claim 8 comprising:
determining that the print job is a multiple copy type print job; and
creating a multi-sheet job model for processing the multiple copy type print job instead of the single sheet job model.

14. A non-transitory computer readable medium embodying programmed instructions, which, when executed by a processor, are operable for performing a method comprising:
receiving a print job that includes a plurality of pages;
receiving a request for sheet properties of a group of pages among the plurality of pages in the print job for a processing task by a processing unit, wherein the sheet properties are print properties for individual sheets;
establishing a single sheet job model in memory for the request, wherein the single sheet job model defines a unit of the memory designated to repeatedly refresh sheet property content of a predetermined number of pages; and
providing sheet properties of the group of pages to the processing unit to fulfill the request by iteratively:
retrieving sheet properties of a number of pages of the group based on the predetermined number of pages of the single sheet job model;
inserting sheet properties of the number of pages of the group into the single sheet job model;
providing contents of the single sheet job model to the processing unit to supply the sheet properties of the number of pages to the processing task; and erasing the sheet properties of the number of pages from the single sheet job model.

15. The medium of claim 14, wherein:
the single sheet job model includes a job property portion that includes job properties of the group and a sheet property portion that includes the sheet properties; and
the method further comprises fulfilling the request of the processing unit by iteratively:
  inserting the sheet properties of the number of pages into a sheet property portion of the single sheet job model;
  providing the sheet properties of the number of pages stored in the single sheet job model to the processing task;
  erasing the sheet properties of the number of pages from the sheet property portion of the single sheet job model; and
  maintaining the job properties of the print job in the job property portion of the single sheet job model during processing of the group of pages for the processing task.

16. The medium of claim 15, wherein the method further comprises:
  processing the print job for the job properties with a preflight unit;
  inserting the job properties obtained from the preflight unit into the job property portion of the single sheet job model; and
  maintaining the job property portion as a constant in the single sheet job model during processing of another group of pages for another task performed by one of a preview unit, an editing unit, or a Raster Image Processing (RIP) system.

17. The medium of claim 15, wherein the method further comprises:
  inserting the sheet properties of the number of pages according to an N-up configuration of the group, wherein N is greater than one, and wherein the single sheet job model in the memory represents sheet properties of all pages in the request for processing the group of pages for the processing task.

18. The medium of claim 14, wherein the method further comprises:
  determining that the print job is a redrive print job; and
  creating a multi-sheet job model for processing the print jobs instead of the single sheet job model, wherein the multi-sheet job model includes page offsets for reprocessing of the print job.

19. The medium of claim 14, wherein the method further comprises:
  determining that the print job is a multiple copy type print job; and
  creating a multi-sheet job model for processing the multiple copy type print job instead of the single sheet job model.

20. The medium of claim 14, wherein the method further comprises:
  initiating processing tasks for the print job with multiple processing units;
  wherein each of the multiple processing units includes its own sheet controller configured to perform processing tasks using single sheet job models.

* * * * *